(12) United States Patent
Hapsari et al.

(10) Patent No.: US 8,761,123 B2
(45) Date of Patent: *Jun. 24, 2014

(54) MOBILE COMMUNICATION SYSTEM

(71) Applicant: NTT DoCoMo, Inc., Tokyo (JP)

(72) Inventors: Wuri Andarmawanti Hapsari, Kanagawa (JP); Hideaki Takahashi, Kanagawa (JP); Anil Umesh, Kanagawa (JP); Mikio Iwamura, Tokyo (JP); Minami Ishii, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,959

(22) Filed: Aug. 2, 2013

(65) Prior Publication Data

US 2013/0315206 A1 Nov. 28, 2013

Related U.S. Application Data

(62) Division of application No. 13/266,482, filed as application No. PCT/JP2010/057085 on Apr. 21, 2010.

(30) Foreign Application Priority Data

Apr. 27, 2009 (JP) ................................ 2009-108561

(51) Int. Cl.
H04W 4/00 (2009.01)
H04W 36/18 (2009.01)

(52) U.S. Cl.
CPC .................................... *H04W 36/18* (2013.01)
USPC ....................................................... 370/331

(58) Field of Classification Search
CPC ...... H04L 47/10; H04W 80/04; H04W 36/18; H04W 36/30; H04W 36/08

USPC ......... 370/241, 252, 310, 328, 329, 331, 332, 370/333; 455/403, 422.1, 436, 437, 438, 455/442

See application file for complete search history.

(56) References Cited

U.S. PATENT DOCUMENTS

2007/0086388 A1 4/2007 Kang et al.
2008/0090575 A1 4/2008 Barak et al.
(Continued)

FOREIGN PATENT DOCUMENTS

JP 2007-116696 A 5/2007
JP 2008-172757 A 7/2008
(Continued)

OTHER PUBLICATIONS

3GPP TS 36.423 V10.3.0, "3rd Generation Partnership Project; Technical Specification Group Radio Access Network; Evolved Universal Terrestrial Radio Access Network (E-UTRAN); X2 application protocol (X2AP) (Release 10)," 132 pages.

(Continued)

Primary Examiner — Obaidul Huq
(74) Attorney, Agent, or Firm — Osha Liang LLP

(57) ABSTRACT

A radio base station includes a mobile communication system, a first relay node and a first radio base station connected via a radio bearer, a second relay node, and a second radio base station connected via a radio bearer. The first radio base station and the second radio base station are connected via a bearer, in which a mobile station is configured so as to conduct a handover process between a first and second state. In the first state a radio bearer is established with the first relay node in order to communicate. In the second state a radio bearer is established with the second relay node in order to communicate. The mobile station is configured such that in the handover process, control signals are transmitted and received via the radio bearer between the first relay node, first radio base station, second radio base station, and second relay node.

1 Claim, 8 Drawing Sheets

(56) References Cited

U.S. PATENT DOCUMENTS

| | | | |
|---|---|---|---|
| 2008/0285501 | A1 | 11/2008 | Zhang et al. |
| 2010/0046418 | A1* | 2/2010 | Horn et al. .................. 370/315 |
| 2010/0195635 | A1 | 8/2010 | Maeda |
| 2010/0238900 | A1 | 9/2010 | Johansson et al. |
| 2010/0296448 | A1* | 11/2010 | Vainikka et al. ............. 370/328 |
| 2011/0086639 | A1 | 4/2011 | Kalervo Hamalainen et al. |
| 2012/0051349 | A1 | 3/2012 | Teyeb et al. |

FOREIGN PATENT DOCUMENTS

| | | |
|---|---|---|
| JP | 2008-236269 A | 10/2008 |
| WO | 2009/022610 A1 | 2/2009 |
| WO | 2009/022750 A2 | 2/2009 |

OTHER PUBLICATIONS

Office Action issued on Oct. 4, 2011 in corresponding Japanese Application No. 2009-108561, with translation (6 pages).

International Search Report issued in PCT/JP2010/057085, mailed Jun. 29, 2010, with translation (5 pages).

Office Action for Japanese Application No. 2009-108561 mailed Feb. 14, 2012, with translation (6 pages).

3GPP TSG-RAN WG3 #63bis R3-090702 "Preference for Relay Operation in LTE-A"; Seoul, Korea, Mar. 23, 2009 (6 pages).

Notice of Grounds for Rejection for Japanese Patent Application No. 2011-266133 mailed Jun. 26, 2012, with translation (5 pages).

Huawei, "LTE-A Type 1 relay architecture," 3GPP TSG RAN WG3 Meeting #63bis, R3-090809, Seoul Korea, Mar. 23-26, 2009 (5 pages).

Qualcomm Europe, "Inter-eNB X2 Interface design considerations," 3GPP TSG-RAN WG1 #49bis, R1-072739, Orlando, USA, Jun. 25-29, 2007 (3 pages).

Official Action in counterpart Canadian Patent application No. 2760024 issued on Nov. 18, 2013 (11 pages).

Extended European Search Report in the counterpart European Patent application No. 10769655.1 issued on Dec. 13, 2013 (8 pages).

Extended European Search report in counterpart European Patent application No. 13177977.9 issued on Dec. 13, 2013 (7 pages).

3GPP TS 36.423 V8.5.0; 3rd Generation Partnership Project; Technical Specification Group Radio Access Network; Evolved Universal Terrestrial Radio Access Network (E-UTRAN); X2 application protocol (X2AP) (Release 8); Mar. 2009 (100 pages).

Daniel Schultz, et al.; "Relaying concepts and supporting actions in the context of CGs"; XP007921809 D3.5.1 v1.0; Oct. 31, 2006 (105 pages).

Qualcomm Europe; "Preference for Relay Operation in LTE-A"; 3GPP TSG-RAN WG3 #63bis. R3-090702; Seoul, Korea; Mar. 23-27, 2009 (6 pages).

Ericsson; "A discussion on some technology components for LTE-Advanced"; TSG-RAN WG1 #53, R1-082024; Kansas City, MO, USA; May 5-9, 2008 (11 pages).

* cited by examiner

MOBILE COMMUNICATION SYSTEM

CROSS REFERENCE TO RELATED APPLICATIONS

This is a continuation application of U.S. patent application Ser. No. 13/266,482 filed Oct. 27, 2011, which is a national stage application of PCT/JP2010/057085 filed Apr. 21, 2010, which claims priority to Japanese Patent Application No. 2009-108561 filed Apr. 27, 2009. The content of these applications is incorporated by reference in their entirety.

BACKGROUND OF INVENTION

1. Technical Field

The present invention relates to a mobile communication system.

2. Background Art

A mobile communication system of the LTE scheme (Release.8) defined by the 3GPP, as illustrated in FIG. 8, is configured such that when a handover process by a mobile station UE is carried out from a radio base station eNB#1 to a radio base station eNB#2, control signals involved in the handover process are transmitted and received between the radio base station eNB#1 and the radio base station eNB#2 via an X2 bearer that has been installed between the radio base station eNB#1 and the radio base station eNB#2.

As illustrated in FIG. 8, the radio base station eNB#1 and the radio base station eNB#2 include a network layer 1 (NW L1) function, a network layer 2 (NW L2) function, an IP (Internet Protocol) layer function, and an SCTP (Stream Control Transmission Protocol) layer function as the X2 bearer functions for establishing the X2 bearer.

In the LTE-advanced mobile communication system, which is a next-generation communication scheme of the LTE scheme, "relay nodes (RN)" including the same functions as a radio base station eNB can establish a connection between a mobile station UE and the radio base station eNB.

However, the conventional mobile communication system has a problem in that there is no regulation for how handover processes by the mobile station UE are to be handled when the relay nodes RN have been connected.

SUMMARY OF INVENTION

One or more embodiments of the present invention may provide a mobile communication system capable of implementing a handover process by a mobile station even when a relay node is connected.

The first feature of the present invention is summarized in that a mobile communication system, a first relay node and a first radio base station are connected via a radio bearer, a second relay node and a second radio base station are connected via a radio bearer, and the first radio base station and the second radio base station are connected via a bearer; in which a mobile station is configured so as to conduct a handover process between a first state wherein a radio bearer is established with the first relay node in order to communicate via the first relay node and the first radio base station, and a second state wherein a radio bearer is established with the second relay node in order to communicate via the second relay node and the second radio base station and the mobile station is configured such that in the handover process, control signals involved in the handover process are transmitted and received via the radio bearer between the first relay node and the first radio base station, via the bearer between the first radio base station and the second radio base station, and via the radio bearer between the second relay node and the second radio base station.

The first feature of the present invention is summarized in that when a measurement report is received from the mobile station, the first relay node is configured so as to transfer the measurement report to the first radio base station via the radio bearer between the first relay node and the first radio base station, when it is determined based on the measurement report that a handover process of the mobile station from the first state to the second state is to be initiated, the first radio base station is configured so as to transmit a handover request signal giving notification of the determination as a control signal involved in the handover process to the second radio base station via the bearer between the first radio base station and the second radio base station and the second radio base station is configured so as to transfer the received handover request signal to the second relay node via the radio bearer between the second relay node and the second radio base station.

The first feature of the present invention is summarized in that when it is determined that a handover process of the mobile station from the first state to the second state is to be initiated, the first relay node is configured so as to transmit a handover request signal giving notification of the determination as a control signal involved in the handover process to the first radio base station via the radio bearer between the first relay node and the first radio base station and the first radio base station is configured so as to transfer the received handover request signal to the second radio base station via the bearer between the first radio base station and the second radio base station; and the second radio base station is configured so as to transfer the received handover request signal to the second relay node via the radio bearer between the second relay node and the second radio base station.

As has been described above, according to the present invention, it is possible to provide a mobile communication system capable of implementing a handover process by a mobile station even when a relay node is connected.

DETAILED DESCRIPTION

Figure 1:
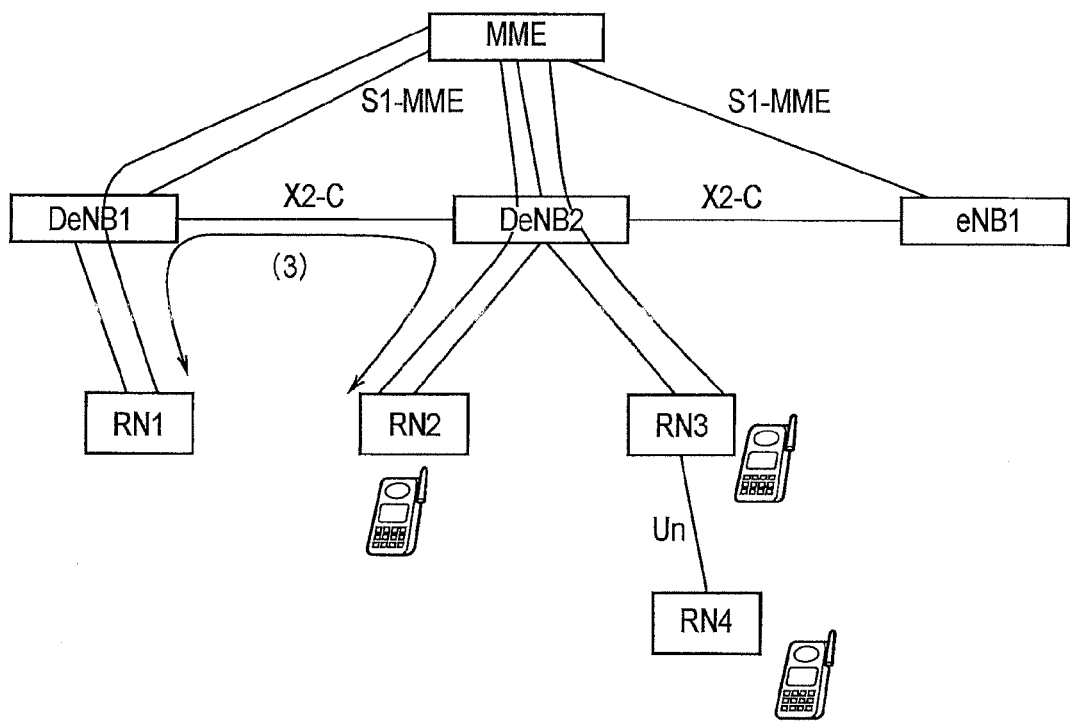
FIG. 1 is a diagram showing the entire configuration of a mobile communication system according to a first embodiment of the present invention.
Figure 2:
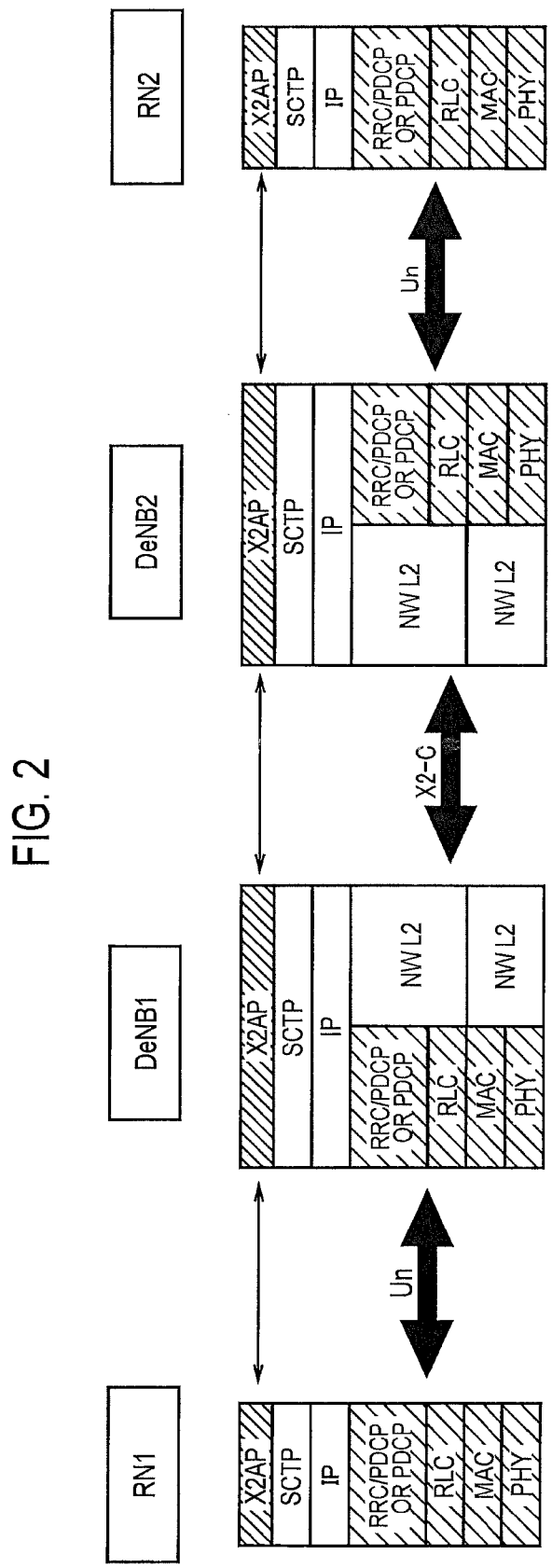
FIG. 2 is a diagram of a protocol stack in the mobile communication system according to the first embodiment of the present invention.
Figure 3:
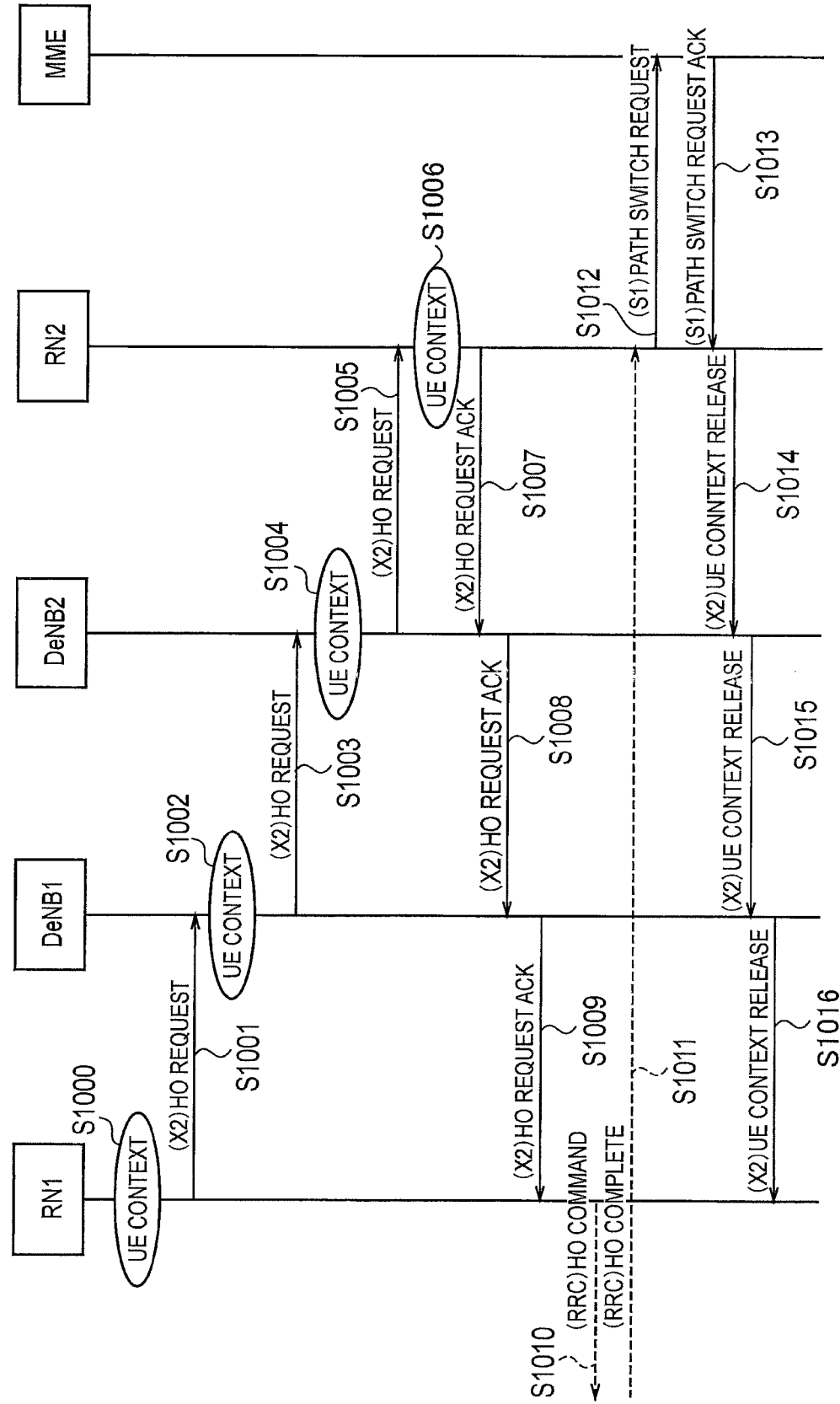
FIG. 3 is a sequence diagram illustrating the operation of the mobile communication system according to the first embodiment of the present invention.

Mobile Communication System According to a First Embodiment of the Present Invention In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. With reference to FIG. 1 to FIG. 3, a mobile communication system according to the first embodiment of the present invention is described.

The mobile communication system according to the present invention is an LTE-Advanced mobile communication system including, for example, as illustrated in FIG. 1, a mobile switching center MME, relay nodes RN1 to RN4, a radio base station DeNB (Donor eNB)1 that is connected to relay node RN1, a radio base station DeNB2 that is connected to the relay nodes RN2 and RN3, and a radio base station eNB1.

Herein, the radio base station DeNB1 and the radio base station DeNB2 are connected via an X2-C interface, and the radio base station DeNB2 and the radio base station eNB1 are connected via an X2-C interface.

Also, the radio base station DeNB1, the radio base station DeNB2 and the radio base station eNB1 are each respectively connected with the mobile switching center MME via the S1-MME interfaces.

In such a mobile communication system, the mobile station UE is configured so as to establish a radio bearer between the radio base stations eNB (DeNB) and the relay nodes RN in order to perform radio communication.

Also, in such a mobile communication system, as illustrated by (3) of FIG. 1, the mobile station UE is configured so as to conduct a handover process between the state in which a radio bearer is established with the relay node RN1 (the first relay node) in order to communicate via the relay node RN1 and the radio base station DeNB1 (the first radio base station), and the state in which a radio bearer is established with the relay node RN2 (the second relay node) in order to communicate via the relay node RN2 and the radio base station DeNB2 (the second radio base station).

Additionally, in such a handover process, control signals (X2AP signals) involved in the handover process are configured so as to be transmitted and received via the radio bearer between the relay node RN1 and the radio base station DeNB1 (Un interface), via the radio bearer between the radio base station DeNB1 and the radio base station DeNB2 (X2-C interface), and via the radio bearer between the relay node RN2 and the radio base station DeNB2 (Un interface).

It is noted that in the present embodiment, a radio bearer (Un interface) is configured not to be established between the relay node RN1 and the relay node RN2.

Specifically, as illustrated in FIG. 2, as X2-C radio bearer functions for establishing an X2-C radio bearer with the radio base station DeNB1 (Un interface), the relay node RN1 includes a physical (PHY) layer function, an MAC (Media Access Control) layer function provided as an upper layer function of the physical (PHY) layer function, an RLC (Radio Link Control) layer function provided as an upper layer function of the MAC layer function, and a PDCP (Packet Data Convergence Protocol) layer function provided as an upper layer function of the RLC layer function.

It is noted that the relay node RN1 may include an RRC (Radio Resource Control) layer function provided as an upper layer function of the PDCP layer function.

As illustrated in FIG. 2, as an upper layer function of the X2-C radio bearer functions, the relay node RN1 may include an IP layer function configured so as to perform security processes between the relay node RN1 and the radio base station DeNB1, and may include an SCTP layer function configured so as to perform keep-alive processes for the X2-C radio bearer as an upper layer function of the IP layer function.

The relay node RN1 may include an X2AP layer function configured to transmit and receive control signals involved in the handover process, as an upper layer function of the SCTP layer function.

Similarly, as X2-C radio bearer functions for establishing an X2-C radio bearer with the radio base station DeNB2 (Un interface), the relay node RN2 includes a physical (PHY) layer function, an MAC layer function provided as an upper layer function of the physical (PHY) layer function, an RLC layer function provided as an upper layer function of the MAC layer function, and a PDCP layer function provided as an upper layer function of the RLC layer function.

It is noted that the relay node RN2 may include an RRC layer function provided as an upper layer function of the PDCP layer function.

As an upper layer function of the X2-C radio bearer functions, the relay node RN2 may include an IP layer function configured so as to perform security processes between the relay node RN2 and the radio base station DeNB2, and may include an SCTP layer function configured so as to perform keep-alive processes for the X2-C radio bearer as an upper layer function of the IP layer function.

The relay node RN2 may include an X2AP layer function configured to transmit and receive control signals involved in the handover process, as an upper layer function of the SCTP layer function.

The radio base station DeNB1 includes an X2-C radio bearer function for establishing an X2-C radio bearer (Un interface) with the relay node RN1, and a bearer function for establishing a bearer (X2-C interface) with the radio base station DeNB2.

Herein, the radio base station DeNB1 includes a network layer 1 (NW L1) function and a network layer 2 (NW L2) function as bearer functions.

The radio base station DeNB1 also includes an IP layer function provided as an upper layer function of the X2-C radio bearer function and the bearer function, an SCTP layer function provided as an upper layer function of the IP layer, and an X2AP layer function provided as an upper layer function of the SCTP layer function.

Similarly, the radio base station DeNB2 includes an X2-C radio bearer function for establishing an X2-C radio bearer (Un interface) with the relay node RN2, and a bearer function for establishing a bearer (X2-C interface) with the radio base station DeNB1.

Herein, the radio base station DeNB2 includes a network layer 1 (NW L1) function and a network layer 2 (NW L2) function as bearer functions.

The radio base station DeNB2 also includes an IP layer function provided as an upper layer function of the X2-C radio bearer function and the bearer function, an SCTP layer function provided as an upper layer function of the IP layer function, and an X2AP layer function provided as an upper layer function of the SCTP layer function.

A description is given below with reference to FIG. 3 for the operation in the mobile communication system according to the present embodiment in which the mobile station UE hands over from the state in which a radio bearer has been established with the relay node RN1 in order to communicate via the relay node RN1 and the radio base station DeNB1, to the state in which a radio bearer has been established with the relay node RN2 in order to communicate via the relay node RN2 and the radio base station DeNB2.

As illustrated in FIG. 3, the relay node RN1 manages the "UE Context" of the mobile station UE in step S1000, and transmits an "HO Request (handover request signal)" to the radio base station DeNB1 via the X2-C radio bearer in step S1001 to request a handover by the mobile station UE from the relay node RN1 to the relay node RN2.

The radio base station DeNB1, upon receiving the "HO Request" in the X2AP layer function, stores the "UE Context" of the mobile station UE in step S1002, and transfers the "HO Request" to the radio base station DeNB2 via the X2-C radio bearer in step S1003.

The radio base station DeNB2, upon receiving the "HO Request" in the X2AP layer function, stores the "UE Context" of the mobile station UE in step S1004, and transfers the "HO Request" to the relay node RN2 via the X2-C radio bearer in step S1005.

The relay node RN2, upon receiving the "HO Request", stores the "UE Context" of the mobile station UE in step S1006, and transmits an "HO Request Ack (handover request acknowledgement signal)" to the radio base station DeNB2 via the X2-C radio bearer in step S1007.

The radio base station DeNB2, upon receiving the "HO Request Ack" in the X2AP layer function, transfers the "HO Request Ack" to the radio base station DeNB1 via the X2-C radio bearer in step S1008.

The radio base station DeNB1, upon receiving the "HO Request Ack" in the X2AP layer function, transfers the "HO Request Ack" to the relay node RN1 via the X2-C radio bearer in step S1009.

In step S1010, the relay node RN1 transmits an "HO Command (handover instruction signal)" to the mobile station UE commanding a handover to the relay node RN2 by means of the RRC layer function.

In step S1011, the mobile station UE transmits an "HO Complete (handover completion signal)" to the relay node RN2 by means of the RRC layer function.

In step S1012, the relay node RN2 transmits a "Path Switch Request (path switch request signal)" to the mobile switching center MME via the S1-MME interface.

In step S1013, the mobile switching center MME transmits a "Path Switch Request Ack (path switch request acknowledgement signal)" to the relay node RN2 via the S1-MME interface, and also switches the signal transfer destination addressed to the mobile station UE from the relay node RN1 to the relay node RN2.

In step S1014, the relay node RN2 transmits a "UE Context Release" to the radio base station DeNB2 via the X2-C radio bearer; in step S1015, the radio base station DeNB2 transfers the "UE Context Release" to the radio base station DeNB1 via the X2-C radio bearer in the X2AP layer function; in step S1016, the radio base station DeNB1 transfers the "UE Context Release" to the relay node RN1 via the X2-C radio bearer in the X2AP layer function, and the relay node RN1 terminates management of the "UE Context" of the mobile station UE in reaction to the "UE Context Release".

It is noted that in FIG. 3, it is acceptable to interchange the relay node RN1 with the relay node RN2 and interchange the radio base station DeNB1 with the radio base station DeNB2.

As described above, the X2AP layer function in the radio base station DeNB1 is configured so as to convert the control signal (X2AP signal) involved in the handover process between the relay node RN1 and the radio base station DeNB1, and the control signal (X2AP signal) involved in the handover process between the radio base station DeNB1 and the radio base station DeNB2.

The X2AP layer function in the radio base station DeNB1 is also configured to manage such that the mobile station ID that is used between the relay node RN1 and the radio base station DeNB1, and the mobile station ID that is used between the radio base station DeNB1 and the radio base station DeNB2 are associated.

Similarly, the X2AP layer function in the radio base station DeNB2 is configured so as to convert the control signal (X2AP signal) involved in the handover process between the relay node RN2 and the radio base station DeNB2, and the control signal (X2AP signal) involved in the handover process between the radio base station DeNB1 and the radio base station DeNB2.

The X2AP layer function in the radio base station DeNB2 is also configured to manage such that the mobile station ID that is used between the relay node RN2 and the radio base station DeNB2 and the mobile station ID that is used between the radio base station DeNB1 and the radio base station DeNB2 are associated.

According to the mobile communication system of the present embodiment, it is possible to implement a handover process involving the relay nodes RN without performing a major renovation of the protocol stack of each device used in the mobile communication system of the LTE scheme.

Figure 4:
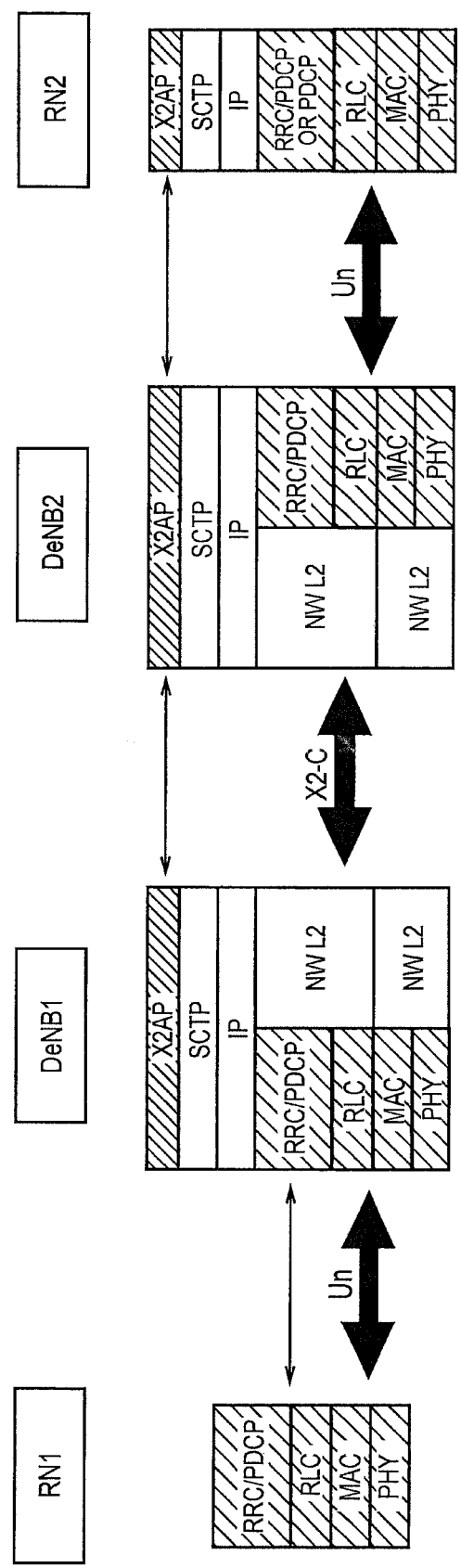
FIG. 4 is a diagram of the protocol stack in the mobile communication system according to a second embodiment of the present invention.
Figure 5:
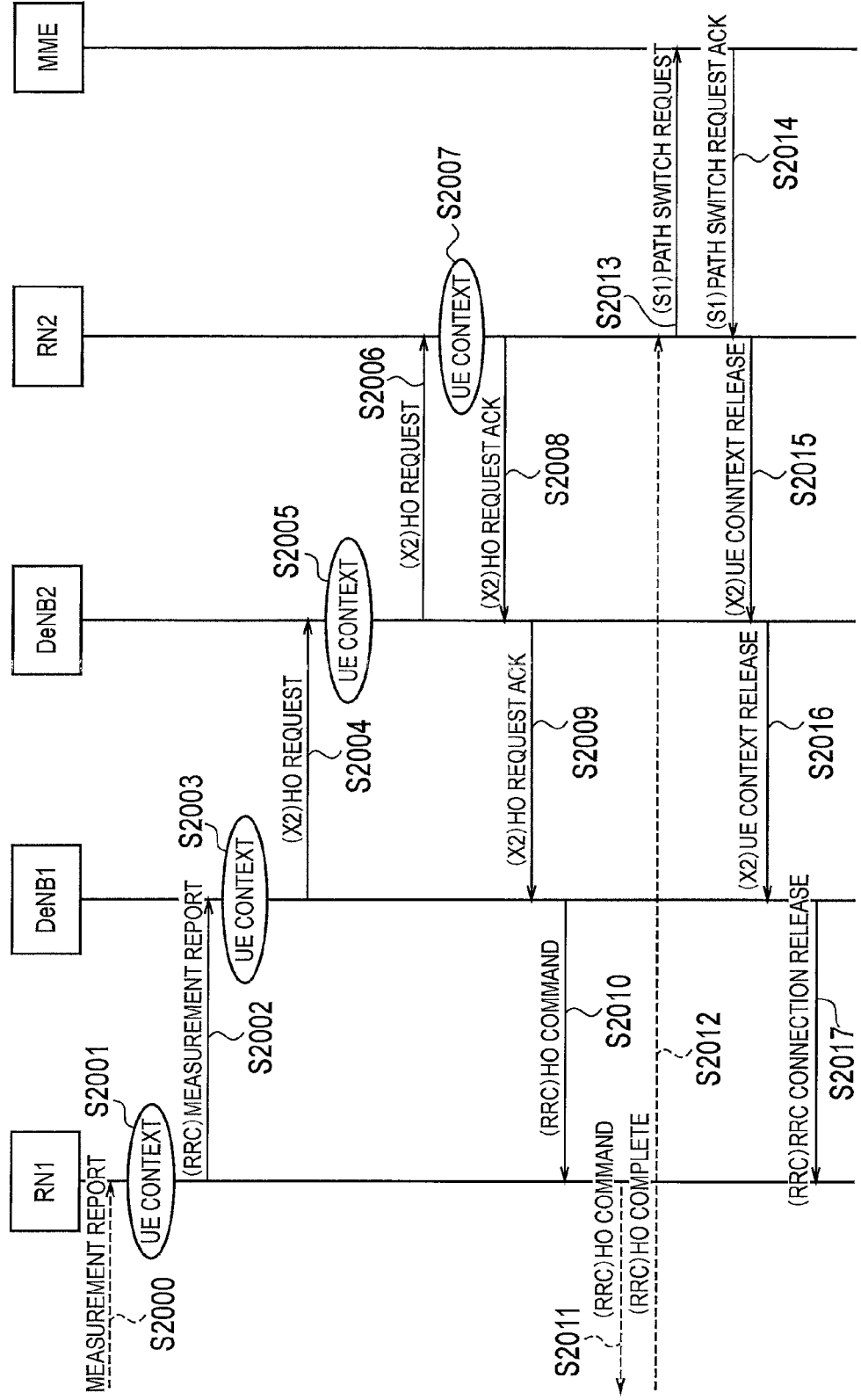
FIG. 5 is a sequence diagram illustrating the operation of the mobile communication system according to the second embodiment of the present invention.

Mobile Communication System According to a
Second Embodiment of the Present Invention A description will be provided for the mobile communication system according to the second embodiment of the present invention, with reference to FIG. 4 and FIG. 5. The mobile communication system according to the second embodiment of the present invention will be described by focusing on the points of difference with the mobile communication system according to the first embodiment as described above.

Specifically, as illustrated in FIG. 4, as X2-C radio bearer functions for establishing an X2-C radio bearer with the radio base station DeNB2 (Un interface), the relay node RN1 includes a physical (PHY) layer function, an MAC layer function provided as an upper layer function of the physical (PHY) layer function, an RLC layer function provided as an upper layer function of the MAC layer function, and a PDCP layer function provided as an upper layer function of the RLC layer function.

It is noted that the relay node RN1 may include an RRC layer function provided as an upper layer function of the PDCP layer function.

As illustrated in FIG. 4, relay node RN1 is configured to operate as a proxy of the RRC layer function in the mobile station UE, and may not include an IP layer function configured so as to perform security processes between the relay node RN2 and the radio base station DeNB2 as an upper layer function of the X2-C radio bearer functions, an SCTP layer function configured so as to perform keep-alive processes for the X2-C radio bearer, and an X2AP layer function configured so as to transmit and receive control signals involved in the handover process.

Further, the protocol stack of the radio base station DeNB1, the radio base station DeNB2 and the relay node RN2 is the same as the protocol stack of the mobile communication system according to the first embodiment as illustrated in FIG. 2.

A description is given below with reference to FIG. 5 for the operation in the mobile communication system according to the present embodiment in which the mobile station UE hands over from the state in which a radio bearer has been established with the relay node RN1 in order to communicate via the relay node RN1 and the radio base station DeNB1, to the state in which a radio bearer has been established with the relay node RN2 in order to communicate via the relay node RN2 and the radio base station DeNB2.

As illustrated in FIG. 5, the relay node RN1, upon receiving a "Measurement Report (measurement report)" from the mobile station UE in step S2000, acquires the "UE Context" of the managing mobile station UE in step S2001 in order to then transfer the "Measurement Report", which includes the "UE Context" of the mobile station UE, to the radio base station DeNB1 by means of the RRC layer function in step S2002.

The radio base station DeNB1 decides to perform a handover process of the mobile station UE from the relay node RN1 to the relay node RN2 based on the received "Measurement Report", and, in step S2003, stores the "UE Context" of the mobile station UE and then, in step S2004, transmits to the radio base station DeNB2 an "HO Request (handover request signal)" requesting a handover of the mobile station UE from the relay node RN1 to the relay node RN2, via the X2-C radio bearer.

The radio base station DeNB2, upon receiving the "HO Request", in the X2AP layer function, stores the "UE Context" of the mobile station UE in step S2005, and transfers the "HO Request" to the relay node RN2 via the X2-C radio bearer in step S2006.

The relay node RN2, upon receiving the "HO Request", stores the "UE Context" of the mobile station UE in step S2007, and transmits an "HO Request Ack (handover request acknowledgement signal)" to the radio base station DeNB2 via the X2-C radio bearer in step S2008.

The radio base station DeNB2, upon receiving the "HO Request Ack" in the X2AP layer function, transfers the "HO Request Ack" to the radio base station DeNB1 in step S2009.

The radio base station DeNB1, upon receiving the "HO Request Ack", transmits an "HO Command (handover instruction signal)" to the relay node RN1 commanding a handover to the relay node RN2 by means of the RRC layer function in step S2010.

In step S2011, the relay node RN1 transfers the received "HO Command" to the mobile station UE by means of the RRC layer function.

In step S2012, the mobile station UE transmits an "HO Complete (handover completion signal)" to the relay node RN2 by means of the RRC layer function.

In step S2013, the relay node RN2 transmits a "Path Switch Request (path switch request signal)" to the mobile switching center MME via the S1-MME interface.

In step S2014, the mobile switching center MME transmits a "Path Switch Request Ack (path switch request acknowledgement signal)" to the relay node RN2 via the S1-MME interface, and also switches the signal transfer destination addressed to the mobile station UE from the relay node RN1 to the relay node RN2.

In step S2015, the relay node RN2 transmits the "UE Context Release" to the radio base station DeNB2 via the X2-C radio bearer, and then, in step S2016, the radio base station DeNB2 transfers the "UE Context Release" to the radio base station DeNB1 via the X2-C radio bearer by means of the X2AP layer function.

In step S2017, the radio base station DeNB1 transfers an "RRC Connection Release" to the relay node RN1 in the RRC layer function, and then the relay node RN1 terminates management of the "UE Context" of the mobile station UE in reaction to the "RRC Connection Release".

Figure 6:
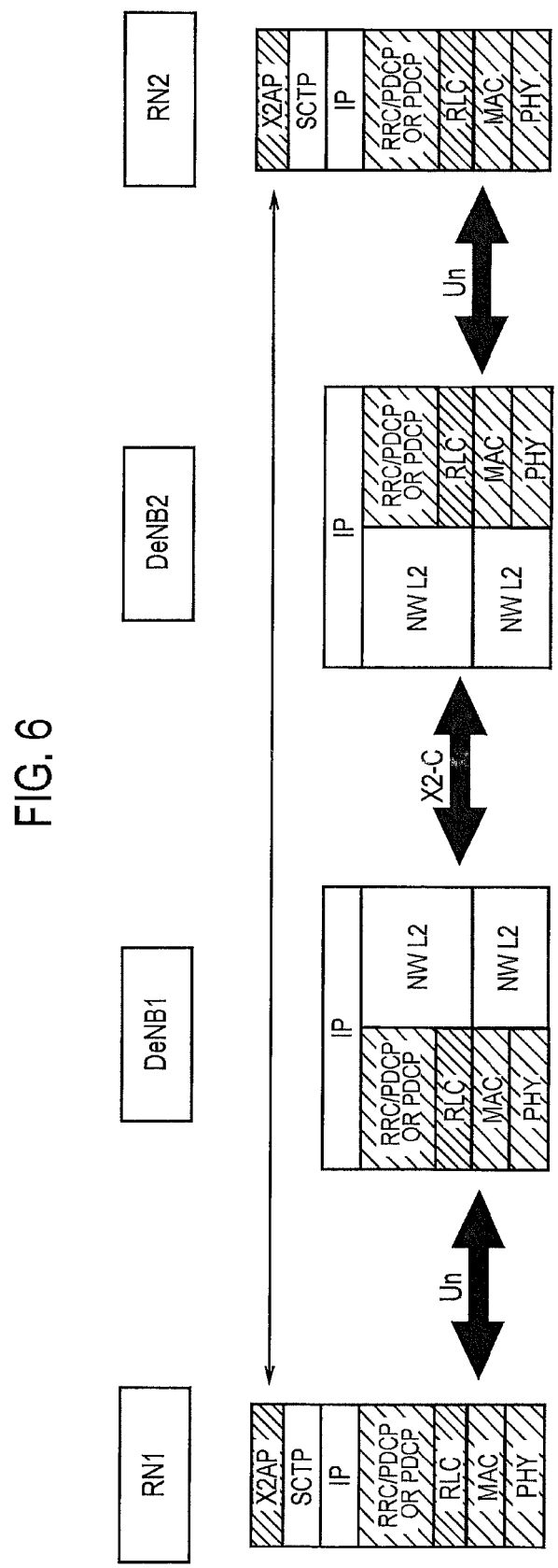
FIG. 6 is a diagram of the protocol stack in the mobile communication system according to a third embodiment of the present invention.
Figure 7:
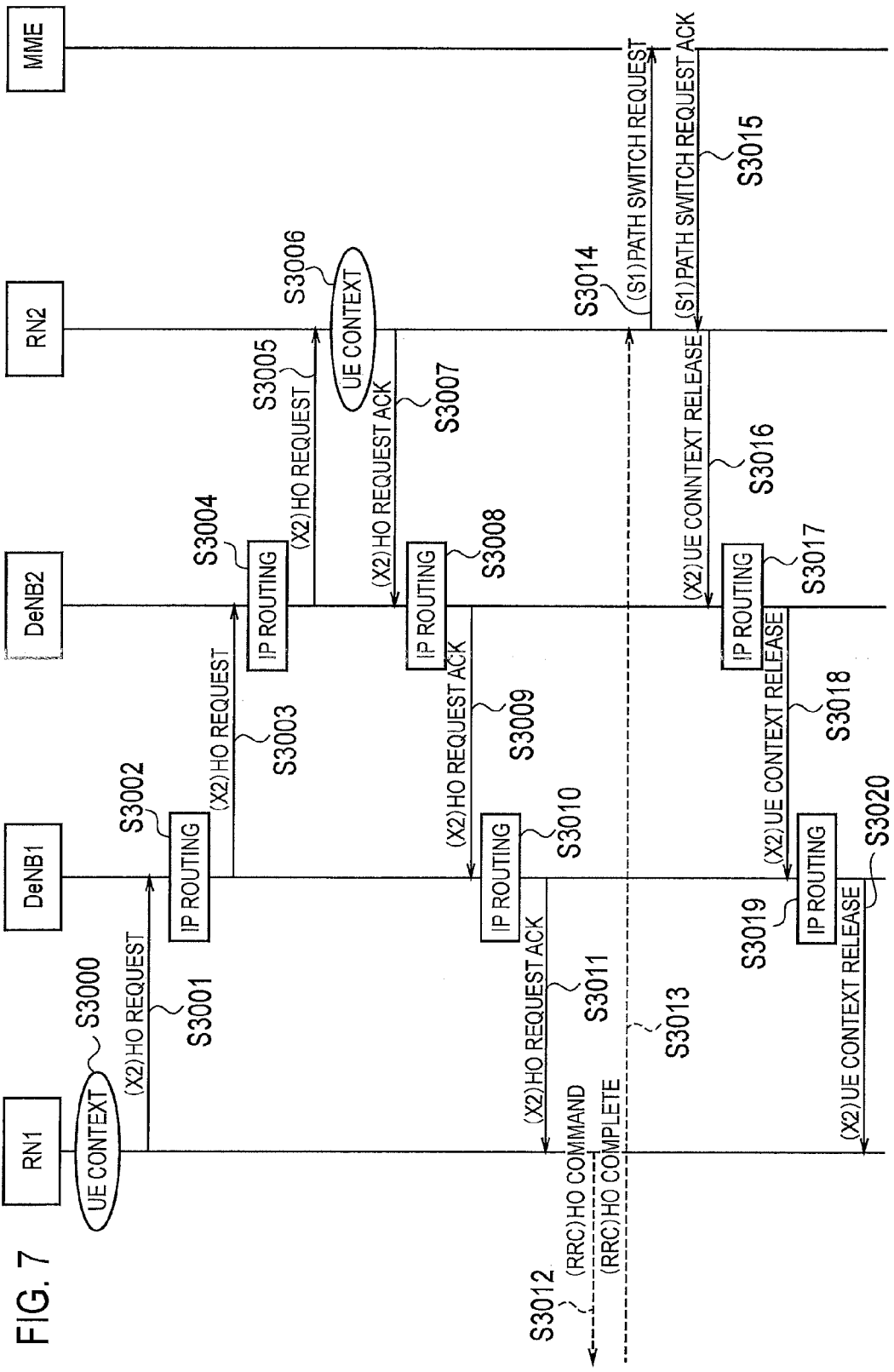
FIG. 7 is a sequence diagram illustrating the operation of the mobile communication system according to the third embodiment of the present invention.
Figure 8:
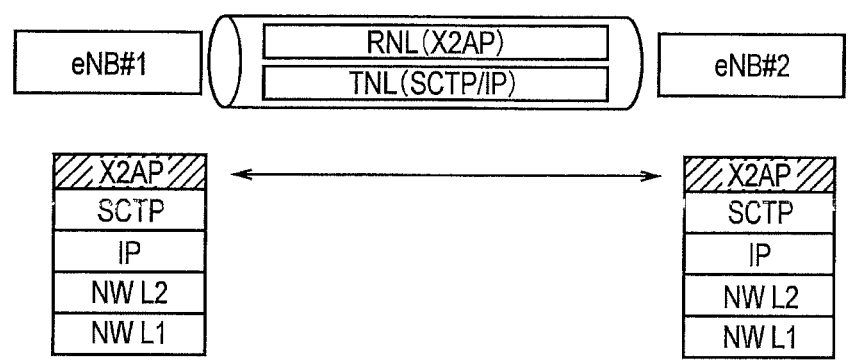
FIG. 8 is a diagram of the protocol stack in a current mobile communication system.

Mobile Communication System According to a Third Embodiment of the Present Invention A description will be provided for the mobile communication system according to the third embodiment of the present invention, with reference to FIG. 6 and FIG. 7. The mobile communication system according to the third embodiment of the present invention will be described by focusing on the points of difference with the mobile communication system according to the first embodiment as described above.

Specifically, as illustrated in FIG. 6, the radio base station DeNB1 includes an X2-C radio bearer function for establishing an X2-C radio bearer (Un interface) with the relay node RN1, and with a bearer function for establishing a bearer (X2-C interface) with the radio base station DeNB2.

Herein, the radio base station DeNB1 includes a network layer 1 (NW L1) function and a network layer 2 (NW L2) function as bearer functions.

The radio base station DeNB1 also includes the X2-C radio bearer function and an IP layer function provided as an upper layer function of the bearer function and the bearer function, but does not include an SCTP layer function or X2AP layer function as upper layer functions of the IP layer function.

Similarly, the radio base station DeNB2 includes an X2-C radio bearer function for establishing an X2-C radio bearer (Un interface) with the relay node RN2, and a bearer function for establishing a bearer (X2-C interface) with the radio base station DeNB1.

Herein, the radio base station DeNB2 includes a network layer 1 (NW L1) function and a network layer 2 (NW L2) function as bearer functions.

The radio base station DeNB2 also includes an IP layer function provided as an upper layer function of the X2-C radio bearer function and the bearer function, but does not include an SCTP layer function or X2AP layer function as upper layer functions of the IP layer function.

It is noted that the protocol stack of the relay node RN1 and the relay node RN2 is the same as the protocol stack of the mobile communication system according to the first embodiment as illustrated in FIG. 2.

A description is given below with reference to FIG. 7 for the operation in the mobile communication system according to the present embodiment in which the mobile station UE hands over from the state in which a radio bearer has been established with the relay node RN1 in order to communicate via the relay node RN1 and the radio base station DeNB1, to the state in which a radio bearer has been established with the relay node RN2 in order to communicate via the relay node RN2 and the radio base station DeNB2.

As illustrated in FIG. 7, the relay node RN1 manages the "UE Context" of the mobile station UE in step S3000, and transmits an "HO Request (handover request signal)" to the radio base station DeNB1 via the X2-C radio bearer in step S3001 to request a handover by the mobile station UE from the relay node RN1 to the relay node RN2.

The radio base station DeNB1, upon receiving the "HO Request" in step S3002 by means of the IP layer function, transfers the "HO Request" to the radio base station DeNB2 via the X2-C radio bearer in step S3003.

The radio base station DeNB2, upon receiving the "HO Request" in step S3004 by means of the IP layer function, transfers the "HO Request" via the X2-C radio bearer to the relay node RN2 in step S3005.

The relay node RN2, upon receiving the "HO Request", stores the "UE Context" of the mobile station UE in step S3006, and transmits an "HO Request Ack (handover request acknowledgement signal)" to the radio base station DeNB2 via the X2-C radio bearer in step S3007.

The radio base station DeNB2, upon receiving the "HO Request Ack" by means of the IP layer function in step S3008, transfers the "HO Request Ack" to the radio base station DeNB1 via the X2-C radio bear in step S3009.

The radio base station DeNB1, upon receiving the "HO Request Ack" by means of the IP layer function in step S3010, transfers the "HO Request Ack" to the relay node RN1 via the X2-C radio bearer in step S3011.

In step S3012, the relay node RN1 transmits an "HO Command (handover instruction signal)" to the mobile station UE commanding a handover to the relay node RN2 by means of the RRC layer function.

In step S3013, the mobile station UE transmits an "HO Complete (handover completion signal)" to the relay node RN2 by means of the RRC layer function.

In step S3014, the relay node RN2 transmits a "Path Switch Request (path switch request signal)" to the mobile switching center MME via the S1-MME interface.

In step S3015, the mobile switching center MME transmits a "Path Switch Request Ack (path switch request acknowledgement signal)" to the relay node RN2 via the S1-MME interface, and also switches the signal transfer destination addressed to the mobile station UE from the relay node RN1 to the relay node RN2.

In step S3016, the relay node RN2 transmits a "UE Context Release" to the radio base station DeNB2 via the X2-C radio bearer.

The radio base station DeNB2, upon receiving the "UE Context Release" by means of the I layer function in step S3017, transfers the "UE Context Release" to the radio base station DeNB1 via the X2-C radio bearer in step S3018.

The radio base station DeNB1, upon receiving the "UE Context Release" by means of the I layer function in step S3019, transfers the "UE Context Release" to the relay node RN1 via the X2-C radio bearer in step S3020, and the relay node RN1 terminates the management of the "UE Context" of the mobile station UE in reaction to the "UE Context Release".

Note that operation of the above described the mobile station UE, the relay node RN, the radio base station eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station eNB and the mobile switching center MME. Also, the storage medium and the processor may be provided in the mobile station UE, the relay node RN, the radio base station eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication system in which a first relay node and a first radio base station are connected via a radio bearer, a second relay node and a second radio base station are connected via a radio bearer, and the first radio base station and the second radio base station are connected via a bearer, wherein the first relay node and the second relay node each comprise:
as a radio bearer function between the first radio base station and the second radio base station, a physical layer function;
an MAC (Media Access Control) layer function provided as an upper layer function of the physical layer function;
an RLC (Radio Link Control) layer function provided as an upper layer function of the MAC layer function; and a PDCP (Packet Data Convergence Protocol) layer function provided as an upper layer function of the RLC layer function,
the first relay node and the second relay node comprise:
an IP (Internet Protocol) layer function as an upper layer function of the radio bearer function;
an SCTP (Stream Control Transmission Protocol) layer function provided as an upper layer function of the IP layer function; and
an X2AP (X2 Application Protocol) layer function provided as an upper layer function of the SCTP layer function, and
the first radio base station and the second radio base station each comprise:
as a radio bearer function between the first relay node and the second relay node, a physical layer function;
an MAC layer function provided as an upper layer function of the physical layer function; and
an RLC layer function provided as an upper layer function of the MAC layer function;
a PDCP layer function provided as an upper layer function of the RLC layer function,
the first radio base station and the second radio base station comprise:
an IP layer function as an upper layer function of the radio bearer function;
an SCTP layer function provided as an upper layer function of the IP layer function; and
an X2AP layer function provided as an upper layer function of the SCTP layer function,
a control signal relating to a handover process is configured to terminate between the X2AP layer function of the first relay node and the X2AP layer function of the first radio base station and between the X2AP layer function of the second relay node and the X2AP layer function of the second radio base station; and the SCTP layer function of the relay node and the SCTP layer function of the first radio base station are configured to perform keep-alive processes for the radio bearer.

* * * * *